350-166 SEARCH R

June 16, 1959 M. E. WIDDOP ET AL 2,890,624

INTERFERENCE COLOR FILTER WITH BLUE ABSORBING LAYERS

Filed Oct. 7, 1952 2 Sheets-Sheet 1

Fig. 1A.

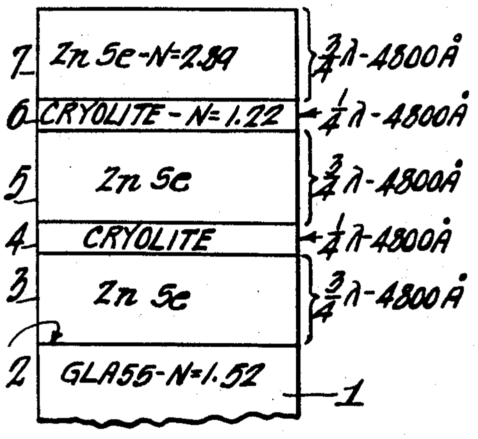

Fig. 1B.

| | | |
|---|---|---|
| Zn Se | TO MAX. | 970% |
| Zn Se | TO MIN. | 70% |
| Zn Se | TO MAX. | 1407% |
| CRYOLITE | TO MIN. | 490% |
| Zn Se | TO MAX. | 1200% |
| Zn Se | TO MIN. | 500% |
| Zn Se | TO MAX. | 1200% |
| CRYOLITE | TO MIN. | 1000% |
| Zn Se | TO MAX. | 1230% |
| Zn Se | TO MIN. | 880% |
| Zn Se | TO MAX. | 1200% |

Fig. 2A.

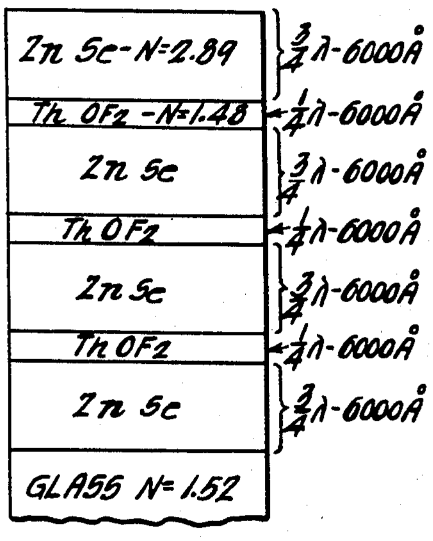

Fig. 2B.

| | | |
|---|---|---|
| Zn Se | TO MAX. | 790% |
| Zn Se | TO MIN. | 150% |
| Zn Se | TO MAX. | 640% |
| Th OF2 | TO MIN. | 160% |
| Zn Se | TO MAX. | 1140% |
| Zn Se | TO MIN. | 160% |
| Zn Se | TO MAX. | 1000% |
| Th OF2 | TO MIN. | 600% |
| Zn Se | TO MAX. | 1240% |
| Zn Se | TO MIN. | 680% |
| Zn Se | TO MAX. | 1160% |
| Th OF2 | TO MIN. | 930% |
| Zn Se | TO MAX. | 1260% |
| Zn Se | TO MIN. | 1060% |
| Zn Se | TO MAX. | 1240% |

INVENTORS
MARY E. WIDDOP
& HUMBOLDT W. LEVERENZ
BY J. L. Whittaker
ATTORNEY

INVENTORS
MARY E. WIDDOP
& HUMBOLDT W. LEVERENZ
BY J. L. Whittaker
ATTORNEY

United States Patent Office

2,890,624
Patented June 16, 1959

2,890,624

INTERFERENCE COLOR FILTER WITH BLUE ABSORBING LAYERS

Mary Ellen Widdop, Audubon, and Humboldt W. Leverenz, Princeton, N.J., assignors to Radio Corporation of America, a corporation of Delaware

Application October 7, 1952, Serial No. 313,482

1 Claim. (Cl. 88—106)

This invention relates to an improved optical device for the transmission and reflection of relatively monochromatic light, and more particularly to an improved interference light color filter characterized by light transmission of one color, light reflection of another color, and light absorption of a third color.

Color selective light filters of the kind generally known as interference, or dichroic, filters are well known. Generally, filters of this class have been characterized by a high degree of efficiency, that is to say, substantially all the visible light impinging on the surface of the filter is either reflected or transmitted, only negligible quantities of light being lost by absorption. Filters of this class have been designed to reflect visible light of a limited range of color, and to transmit visible light of all other colors. It has, however, proved difficult to provide an interference filter of high efficiency that would transmit visible light of a limited range of color only and exclude light of all other colors.

An important feature of the present invention is the provision of an interference filter wherein visible light of a preselected color may be transmitted to the exclusion of visible light of all other colors. This is accomplished through the construction of an interference film using layers of zinc selenide, a material that not only has a relatively high index of refraction but also absorbs relatively large amounts of light of one of the colors it is desired to restrict from transmission.

An object of the invention is to provide a color selective optical device characterized by improved selectivity of light transmission.

Another object of the invention is to provide an improved color selective optical device for selective transmission and reflection of light other than blue light.

Another object of the invention is to provide a color selective optical device that will transmit efficiently light of any selected color other than blue.

Still another object of the invention is to provide an improved color selective device for transmitting light of a preselected color, wherein blue light is removed by absorption.

These and other objects will be more readily apparent and the invention more easily understood by reference to the following detailed description and the drawings of which:

Figures 1A and 2A are drawings of greatly magnified cross-sections of devices made in accordance with the invention.

Figures 1B and 2B are tables showing, respectively, the arrangement and nature of the layers of the films illustrated in Figures 1A and 2A.

Figure 3:
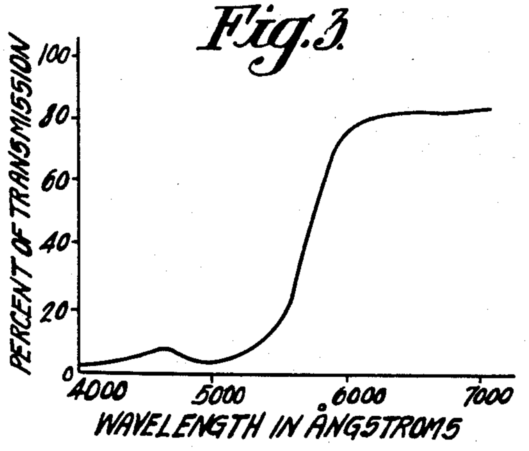
Figure 3 is a curve describing the light transmitting characteristics of the device illustrated in Figure 1A.

In a filter to be used for transmission only it is immaterial whether the light restricted from transmission is reflected or absorbed. The efficiency of such a filter is to be regarded only in respect of the proportion of the impinging light of the preselected color that is transmitted. In the present invention, greatly increased color selectivity of light transmission is provided through the use of a material in the interference layer that is highly absorbent of light in the blue region of the visible spectrum.

Figure 1A illustrates a preferred embodiment of the invention. The filter shown is one designed to transmit light having wave lengths of 6000 Angstroms and more and to restrict from transmission all light having wave lengths of less than about 6000 Angstroms. It includes an optical element 1 which may be of glass or other transparent material and which may be assumed for purposes of illustration to have an index of refraction of 1.5.

A surface 2 of the optical element 1 bears a transparent film composed of five successively superimposed layers designated, respectively, by the reference numerals 3, 4, 5, 6, and 7. Layers 3, 5 and 7 each have an effective optical thickness of three quarters of the wave length of light which it is desired to reflect. These three layers are of zinc selenide which is highly absorbent of blue light and has an index of refraction, N, of approximately 2.89. Layers 4 and 5 each have an effective optical thickness of one quarter of the wave length of light which it is desired to reflect and may be of cryolite ($N=1.22$), thorium-oxy-fluoride ($N=1.48$), or other material having a relatively low refractive index.

The various layers of the interference film may be applied, and their thickness controlled in the manner described in United States Patent No. 2,338,234, issued to G. L. Dimmick on December 10, 1946. In the production according to the method of said patent of the embodiment of Figure 1A a control beam at the angle of 45 degrees to the surface 2 and a filter having maximum transmission at 4800 Angstroms were employed. The various layers were controlled according to the values of reflection shown in Figure 1B, from which it will be seen that zinc selenide was evaporated upon the surface 2 until the light reflection reached 970 percent of the light reflection from the original untreated surface 2, at which point the optical thickness of the zinc selenide was effectively one-fourth the wave length of light of the so-called control frequency (in this instance 4800 Angstroms). Evaporation of zinc selenide was then continued until the reflection passed through a minimum of 70 percent and reached a maximum of 740 percent, at which point the layer was effectively three fourths of one wave length thick and evaporation of zinc selenide was discontinued. Cryolite was then evaporated over the zinc selenide layer until light reflection reached a minimum of 490 percent. Zinc selenide was then again evaporated according to the table of Figure 1B, and the process was continued until three layers of zinc selenide, each three-fourths of one wave length in effective optical thickness, has been deposited, each two of these layers separated by a layer of cryolite one-fourth wave length in effective optical thickness.

The light transmission curve for the device so constructed is given in Figure 3 for light normal to the surface. The improvement obtained through the invention may better be observed by a comparison of Figure 3 with Figure 5 which represents a prior art device.

Figure 5:
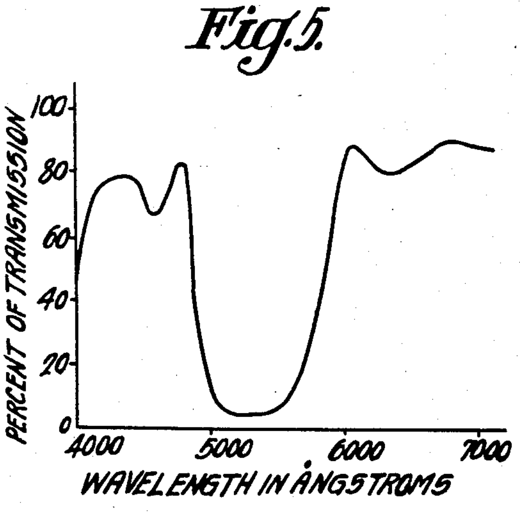
Figures 5 and 6 are curves describing the light transmitting characteristics of devices made in accordance with previous practice rather than in accordance with the invention.

Figure 5 is the light transmission curve for a device made in exactly similar manner as the device shown in Figure 1 except that the first, third and fifth layers of the film were made of zinc sulfide, and the film was controlled for 5300 Angstrom light instead of 4800 Angstrom light.

The difference in the wave lengths for which the respective films were controlled was due merely to practical objects for which the respective films were made. Changing the control wave length in constructing the film of Figure 5 would merely shift the light transmission curve along the abscissa scale and would not appreciably change the shape of the curve. Figure 5, therefore, sufficiently illustrates the disadvantages of the prior art devices overcome by the invention.

Comparing Figures 3 and 5 it will be noted that, in the device of Figure 5, light of the controlled wave length is restricted from transmission, but light of both shorter and longer wave lengths is transmitted. In the device of Figure 3, made in accordnace with the invention, only light of longer wave length than that controlled is transmitted.

In the device of Figure 5 light of the controlled wave length is reflected, all other light being transmitted. While in the device of Figure 3 light of the controlled wave length is also reflected, only light of longer wave length is transmitted, light of shorter wave length being absorbed.

Figure 2A is a greatly magnified sectional view of another device made in accordance with the invention. This device was made in a manner similar to that used in constructing the device of Figure 1A, except that a control filter for light of 6000 Angstrom wave length was used, the layers of low refractive index between pairs of zinc selenide layers were made of thorium-oxy-fluoride, and the total film consists of four layers of zinc selenide and three layers of thorium-oxy-fluoride. The table of Figure 2B describes the production steps for the device of Figure 2A in the same manner that Figure 1B describes the production steps for the device of Figure 1A.

Figure 4:
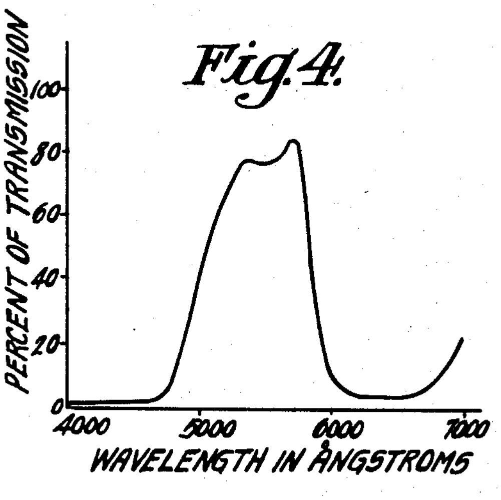
Figure 4 is a curve describing the light transmitting characteristics of the device illustrated in Figure 2A.
Figure 6:
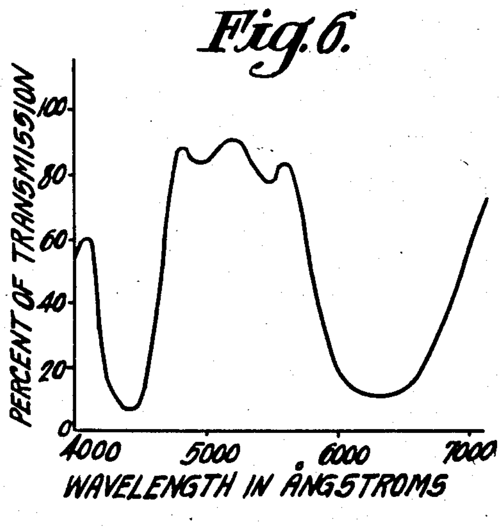

Figure 4 shows the light transmission characteristics of the device of Figure 2A. Figure 6 shows the light transmission characteristics of a filter made according to prior art having layers of zinc sulfide in place of the layers of zinc selenide of the device of Figure 2A. The device of Figure 6 was made in the same manner as the device of Figure 4 except that zinc sulfide was used in place of zinc selenide, and the control wave length was 6350 Angstroms instead of 6000 Angstroms. As explained above, the difference in control wave lengths is relatively unimportant, since the only appreciable effect is to shift the curve along the abscissa of the chart, not to change its shape.

Comparing Figures 4 and 6, it will be seen in Figure 6 that the device made according to prior art transmits a large proportion of blue light and of red light besides the light desired for transmission. It will also be seen in Figure 4 that the transmission band of the device made in accordance with the invention is significantly narrower than that of the device of Figure 6, and that only insignificant proportions of blue light are transmitted. In addition, Figure 4 illustrates a greatly reduced transmission of red light, which reduction is due to the relatively high index of refraction of zinc selenide.

Thus, it will be seen that by the use of zinc selenide in the production of an interference film greatly improved light transmission characteristics may be obtained.

It should be understood that the invention is not limited to the production of light filters of the construction described in the preferred embodiments. Filters of many different arrangements may be made having interference layers of effective optical thickness of about one wave length or any fraction of a wave length of the light to be reflected. The total number of layers composing the film has no theoretical limit. It may be as low as one or as high as one hundred or more, depending on the thickness of the individual layers. The general limitations of design and construction are those common to the art, and are not peculiar to the invention.

For example, a red transmitting filter was made employing layers of zinc selenide one-half wave length in effective optical thickness and one-quarter wave length layers of thorium-oxy-fluoride, according to the following table:

| Materials and Conditions | Percent of Reflection |
|---|---|
| ZnSe: | |
| to max | 920 |
| to min | 185 |
| $ThOF_2$: to min | 65 |
| ZnSe: | |
| to max | 1,000 |
| to min | 85 |
| $ThOF_2$: to max | 155 |
| ZnSe: | |
| to max | 810 |
| to min | 210 |
| $ThOF_2$: to min | 95 |
| ZnSe: | |
| to max | 980 |
| to min | 110 |
| $ThOF_2$: to max | 190 |
| ZnSe: | |
| to max | 780 |
| to min | 155 |

This filter consisted of a total of nine layers, five layers being of zinc selenide and four alternate layers being of thorium-oxy-fluoride. This filter was made under control conditions using a 15° reflection angle and a filter having maximum transmission at 6350 Angstroms. The light transmission characteristics of this filter are such that less than 10 percent of light of shorter wave length than 5500 Angstroms is transmitted, and more than 75 percent of light of longer wave length than 6000 Angstroms is transmitted.

It should also be understood that the low index layers need not be of cryolite or thorium-oxy-fluoride but may be of any other transparent material having a relatively low index of refraction referred to the refractive index of zinc selenide. In general, it may be said that the lower the refractive index of the material used, the more efficient will be the filter, and the fewer layers will be needed in the film to produce a satisfactory filter.

It should further be understood that the optical element need not be of glass, but may be of any light transparent material.

Devices produced in accordance with the invention are particularly suitable in applications such as color television camera tubes, where a restricted band-pass color filter is desired and where it is not practicable to include more than one filter in the optical system.

There has thus been described an improved light filter that transmits light of substantially only one color, and is characterized by the fact that it reflects light of another color and absorbs light of a third color.

What is claimed is:

A light filter for transmitting green and reflecting red light comprising a transparent base and a film disposed on a surface thereof, said film being composed of four layers of zinc selenide, each of said layers being about ¾ wave length of red light in effective optical thickness, and three layers of a substance having a relatively low index of refraction with respect to the index of refraction of said zinc selenide, each of said layers of said substance being about ¼ wave length of red light in effective optical thickness and being disposed alternately between said zinc selenide layers.

References Cited in the file of this patent

UNITED STATES PATENTS

| | | |
|---|---|---|
| 2,519,545 | Colbert et al. | Aug. 22, 1950 |
| 2,552,184 | Koch | May 8, 1951 |
| 2,638,030 | Schroder | May 12, 1953 |
| 2,700,323 | Schroder | Jan. 25, 1955 |

FOREIGN PATENTS

| | | |
|---|---|---|
| 716,153 | Germany | Jan. 14, 1942 |

OTHER REFERENCES

Journal of the Optical Society of America, vol. 37, No. 10, October 1947, article by Banning on pages 792–797 cited.